United States Patent
Anderson et al.

[11] Patent Number: 5,988,115
[45] Date of Patent: Nov. 23, 1999

[54] SCR REACTANT INJECTION GRID

[76] Inventors: David K. Anderson, 25 Mapleshade Ave., East Longmeadow, Mass. 01028; Michael J. Rini, 515 Old Slocum Rd., Hebron, Conn. 06248

[21] Appl. No.: 09/132,535

[22] Filed: Aug. 11, 1998

[51] Int. Cl.$^6$ ........................................................ F22B 1/00
[52] U.S. Cl. .......................... 122/4 D; 110/215; 110/345; 422/171; 422/172
[58] Field of Search ................................. 122/1 A, 4 D; 110/215, 216, 342, 343, 345, 347; 422/171, 172

[56] References Cited

U.S. PATENT DOCUMENTS

| | | | |
|---|---|---|---|
| 4,309,386 | 1/1982 | Pirsh | 422/177 |
| 5,313,895 | 5/1994 | Sekiguchi et al. | 110/346 |
| 5,555,849 | 9/1996 | Wiechard et al. | 122/4 D |

*Primary Examiner*—Philip H. Leung
*Assistant Examiner*—Jiping Lu
*Attorney, Agent, or Firm*—Arthur E. Fournier, Jr.

[57] ABSTRACT

A system and method of injecting an ammonia or urea reactant into a flue gas stream in a steam generating power plant that utilizes Selective Catalytic Reduction (SCR) to lower $NO_x$ emissions and more specifically the injection of the reactant in such a manner that a more uniform mixing of the reactant with the flue gas stream is achieved more rapidly thereby increasing the efficiency of the catalytic reduction process and further a method of increasing the amount of reaction that takes place between the reactant/flue gas mixture and the catalytic material.

16 Claims, 7 Drawing Sheets

SCR REACTANT INJECTION GRID

BACKGROUND OF THE INVENTION

This invention relates to a system and method of injecting an ammonia or urea reactant into a flue gas stream in a steam generating power plant that utilizes Selective Catalytic Reduction (SCR) to lower $NO_x$ emissions and more specifically to the injection of the reactant in such a manner that a more uniform mixing of the reactant with the flue gas stream is achieved as well as a more rapid mixing, thus increasing the efficiency of the catalytic reduction process; and further to a method of increasing the mass transfer limited reaction that takes place between the reactant/flue gas mixture and the catalytic material.

In recent years oxides of nitrogen, also known as $NO_x$, have been implicated as one of the elements contributing to the generation of acid rain and smog. Now, due to very strict state and federal environmental regulations demanding that $NO_x$ emissions be maintained at acceptable levels, the reduction of $NO_x$ both during and after the combustion process is of critical importance and a major concern in the design and operation of modern power plants. Oxides of nitrogen are a byproduct of the combustion of hydrocarbon fuels, such as pulverized coal, gas or oil and are found in two main forms. If the nitrogen originates from the air in which the combustion process occurs, the $NO_x$ is referred to as "thermal $NO_x$". Thermal $NO_x$ forms when very stable molecular nitrogen, $N_2$, is subjected to temperatures above about 2800° F. causing it to break down into elemental nitrogen, N, which can then combine with elemental or molecular oxygen to form NO or $NO_2$.

If the nitrogen originates as organically bound nitrogen within the fuel, the $NO_x$ is referred to as "fuel $NO_x$". The nitrogen content of coal, for instance, is comparatively small and, although only a fraction is ultimately converted to $NO_x$, it is the primary source of the total $NO_x$ emissions from a coal-fired steam generating power plant.

One post-combustion process for the lowering of $NO_x$ emissions is that of Selective Catalytic Reduction (SCR). Selective Catalytic Reduction systems use a catalyst and a reactant such as ammonia gas, $NH_3$, to dissociate $NO_x$ to molecular nitrogen, $N_2$, and water vapor. The catalytic process using ammonia as a reactant is governed by the following chemical reactions:

$$4NO + 4NH_3 + O_2 \rightarrow 4N_2 + 6H_2O \tag{1}$$

$$2NO_2 + 4NH_3 + O_2 \rightarrow 3N_2 + 6H_2O \tag{2}$$

Since $NO_x$ is approximately 95% NO in the flue gas stream, Equation 1 would dominate the process.

Urea is a promising SCR reactant that is coming into use because of some perceived advantages over ammonia. The catalytic process using urea as the reactant is governed by the following chemical equation:

$$CO(NH_2)_2 + 2NO + 1/2O_2 \rightarrow 2N_2 + CO_2 + 2H_2O \tag{3}$$

A typical utility steam generating power plant utilizing Selective Catalytic Reduction as a $NO_x$ reduction technique comprises a furnace volume in fluid communication with a backpass volume. Combustion of hydrocarbon fuels occurs within the furnace volume creating hot flue gases that give up a portion of their energy to the working fluid of a thermodynamic steam cycle. The flue gases are then directed to and through the backpass volume wherein they give up additional energy to the working fluid. Upon exiting the backpass volume the flue gases are directed via a gas duct through a Selective Catalytic Reduction chamber and thence to either an air preheater or to flue gas cleaning systems and thence to the atmosphere via a stack.

The SCR reaction chamber typically includes several layers of solid catalytic material lying within the path of the flue gas stream. The most common types of catalytic material in use and the approximate temperature ranges of the flue gases over which they are effective as catalysts are: Titanium Oxide (270–400° C.), Zeolite (300–430° C.), Iron Oxide (380–430° C.) and activated coal/coke (100–150° C.). The type and amount of catalytic material for which an SCR system need be designed depends upon the flue gas volume, flue gas temperature, total $NO_x$ present in the flue gas, $NO_x$ reduction requirements, permissible ammonia slip, amount of $SO_x$ present in the flue gas stream and the uniformity of the concentration of the reactant in the flue gas stream as the mixture enters the SCR chamber. To help ensure that the temperature of the flue gas stream is within the aforesaid temperature ranges it is typical that a bypass duct is utilized that passes from the upper portion of the backpass volume to the gas duct such that still relatively hot flue gases are diverted from the backpass volume to a point in the gas duct upstream of the location of the injection of the reactant. This however may give rise to temperature gradients in the resultant flue gas stream. Furthermore, due to the geometry of the gas ductwork it is possible to acquire gradients in the mass flow rate of the flue gas across the flue gas stream upstream of the location of the injection of the reactant.

In a typical SCR system, at some point in the gas duct after the flue gas stream exits the backpass volume and after the bypass duct, yet still upstream of the SCR chamber, ammonia, in a gaseous or anhydrous form, or a urea/water solution is introduced into, and encouraged to mix with, the flue gas stream. The reactant/flue gas mixture then enters the SCR chamber where the catalytic reductions, shown in Equations 1, 2 or 3 take place.

Typical of prior art methods of introducing a reactant into a flue gas is seen in U.S. Pat. No. 4,297,319 which issued on Oct. 27, 1981 and is entitled "Apparatus For Removing Nitrogen Oxides From Flue Gas" and which teaches adding ammonia and hydrogen peroxide to the flue gas from an ammonia nozzle and a hydrogen peroxide nozzle. It is also seen in U.S. Pat. No. 4,309,386 which issued on Jan. 5, 1982 and is entitled "Filter House Having Catalytic Filter Bags For Simultaneously Removing $NO_x$ And Particulate Matter From A Gas Stream", that ammonia is introduced into a flue gas inlet conduit via an ammonia distribution grid. Furthermore, U.S. Pat. No. 5,296,206 which issued on Mar. 22, 1994 and is entitled "Using Flue Gas Energy To Vaporize Aqueous Reducing Agent For Reduction Of $NO_x$ In Flue Gas" teaches an injection grid of a known type and U.S. Pat. No. 5,326,536 which issued on Jul. 5, 1994 and is entitled "Apparatus For Injecting $NO_x$ Inhibiting Liquid Reagent Into The Flue Gas Of A Boiler In Response To A Sensed Temperature" teaches the use of a retractable spray nozzle inserted into the flue gas passageways in order to spray a liquid reagent. Still further, disclosed in U.S. Pat. No. 5,380,499, which issued on Jan. 10, 1995 and is entitled "Combined Heat Exchanger And Ammonia Injection Process", is a grid of injection pipes located in the flue gas ductwork and upstream of a SCR catalyst bed.

Also found in the prior art is the use of urea as a reactant. In particular U.S. Pat. No. 4,719,092 which issued on Jan. 12, 1988 and is entitled "Reduction Of Nitrogen-Based Pollutants Through The Use Of Urea Solutions Containing Oxygenated Hydrocarbon Solvents" teaches a process of injecting an aqueous solution of urea and an oxygenated hydrocarbon into an oxygen rich effluent from the combustion of a carbonaceous fuel. Furthermore, U.S. Pat. No. 5,139,754 which issued on Aug. 18, 1992 and is entitled "Catalytic/Non-Catalytic Combination Process For Nitrogen Oxides Reduction" teaches a process whereby a nitrogenous treatment agent is introduced into the effluent from the combustion of a carbonaceous fuel and wherein urea is much preferred as the nitrogenous treatment agent. Still further, U. S. Pat. No. 5,399,326 which issued on Mar. 21, 1995 and is entitled "Process For Noncatalytic $NO_x$ Abatement" teaches a process of injecting into a gas stream a liquid composition comprising urea, ammonia and water. Yet further, U. S. Pat. No. 5,478,542 which issued on Dec. 26, 1995 and is entitled "Process For Minimizing Pollutant Concentrations In Combustion Gases" teaches a process of injecting a $NO_x$ reducing mixture into a passage containing a combustion effluent and wherein the mixture contains a liquid component of a urea solution.

The design of an SCR system is dictated by such considerations as the concentration of $NO_x$ entering and leaving the SCR chamber, the flue gas temperature, the ammonia/$NO_x$ stoichiometric ratio, the flue gas volumetric flow rate and the available surface area of the catalytic material. To ensure optimized SCR operation, it is necessary that the distribution of the reactant across the flue gas stream be as uniform as possible, typically within +/−15% of an average value upon entering the SCR chamber. However, a more uniform mixing helps ensure that the catalytic reduction occurs more evenly over all of the surface of the catalytic material and a more efficient use of the catalytic material is realized. As a consequence, for a fixed cross sectional area of catalytic material, the amount of catalytic material for which an SCR system need be designed may be reduced; thus reducing pressure losses in the power plant and thereby improving plant efficiency.

It is desirable that the aforesaid mixing be completed before the mixture enters the SCR chamber in order to optimize completion of the catalytic reduction therein. However, the reactant mixing requires a certain amount of time to complete, and as a consequence, at fixed flue gas velocities, also requires that a certain length of ductwork be made available from the point of injection of the reactant into the flue gas stream to the entrance to the SCR chamber. In a power plant that is being retrofitted with an SCR system there may in fact be very limited ductwork available in which to allow time for the necessary mixing and in the design of a new power plant there may be limited area available for plant layout. Thus, by increasing the rapidity with which the reactant mixes with the flue gas stream, an opportunity is made available for a reduction in the length of ductwork necessary from the point of injection of the reactant to the entrance to the SCR chamber.

The maximum allowed additional pressure drop in a typical retrofit SCR application is about 4" WG. Of that pressure drop about 3" WG may be directly attributable to the presence of the catalytic material. However, in many retrofit applications, the SCR chamber is typically forced in between the existing economizer outlet and the air heater inlet with little opportunity for designing aerodynamically sound connecting ductwork. To meet strict inlet flue gas and reactant flow profile requirements at the initial surface of the catalytic material, flow controls of some type are required. Typically a series of controls, employed to ensure uniform mixing of the reactant across the flue gas stream, are located after the point at which the reactant is injected into the flue gas stream. This is followed by a series of controls, located just prior to the entrance to the SCR chamber, to enforce a more uniform mass flow rate of flue gas across the surface of the catalyst. However, these controls impose additional pressure losses upon the system. Therefore, it is desirable that the means by which the reactant is introduced into the flue gas stream cause a minimal increase in the total pressure coefficient, K, of the power plant. The total pressure coefficient, K, is the ratio of the static head to the dynamic head of a flowing fluid and can be thought of as a measure of the resistance offered to the flow of the flue gas stream.

Thus, current methods of introducing a reactant into the flue gas stream, while sometimes capable of improving upon the uniformity of the distribution of reactant across the flue gas stream, still leave room for improvement in the uniformity distribution and for allowing mixing to occur in a sufficiently rapid manner.

SUMMARY OF THE INVENTION

The present invention addresses these deficiencies by taking advantage of the dynamics of flowing fields exhibiting rotational motion. With regard to such dynamics, as rotational motion is imparted to a flow field about an axis lying along the direction of flow, the field acquires a tangential momentum component as well as axial and radial components of momentum. A dimensionless ratio which describes the intensity of rotating flow fields is the "swirl number", S, which can be likened to the pitch of a screw. A large S corresponds to a greater number of rotations of fluid per unit length of flow (a high pitch) and a smaller S corresponds to a lesser number of rotations of fluid per unit length of flow (a low pitch). S is defined as the ratio of the axial flux of angular momentum, Gp, to the product of the axial flux of linear momentum, Gx, and a swirl radius term, R. R is the radius of the circle about which the fluid is rotating.

The value of S is governed by the velocity by which rotation is induced in the flow field. Rotating flow fields are characterized as weak swirl (S <0.6) fields or strong swirl (S >0.6) fields. As S is increased in the weak swirl regime there is a linear increase in the amount of entrainment of the flow field into the rotating swirl; thus improving mixing. As S is increased within the strong swirl regime there is a breakdown in the axial, radial and tangential components of velocity of the flow field; signaling the onset of turbulence and further improved mixing. Thus, in the present invention, by a strategic disposition of injection nozzles, rotational motion is imparted to the flue gas stream about an axis or a plurality of parallel axes lying in the direction of flow and parallel to a streamline of the flue gas stream, thereby improving the mixing of reactant and flue gas.

The present invention also overcomes the aforesaid deficiencies by taking advantage of the thermodynamic throttling process. In a thermodynamic throttling process a fluid, confined to a region of relatively high pressure, is allowed to expand to a region of lower pressure through some form of constriction. In the throttling process it is usually assumed that there is no change in the kinetic or potential energies of the fluid as the fluid suffers its loss in pressure. It is also assumed that there is no exchange of heat between the fluid and its surroundings during throttling. With these assumptions and the fact that there is no shaft work performed by the fluid during the process, it can be shown that throttling is an irreversible, isenthalpic process, i.e., there is an increase in turbulence in the fluid and the enthalpy measured at the outlet to the constriction is equal to the enthalpy measured at the inlet to the constriction. Such a process will cause a portion of the fluid to vaporize as well as for there to be an increase in the volume of the fluid. For instance, as a result of undergoing such a process, a portion of saturated water will be converted to steam as the saturated water drops from an elevated pressure to a lower pressure through a constriction.

In the present invention a liquid solution of ammonia reactant and water or urea reactant and water, while under significant pressure, is heated to a temperature well above the atmospheric boiling point of water (100° C.). Upon injection into the flue gas stream, which is at or near atmospheric pressure and generally within a temperature range of about 340° C. to about 400° C., the solution of ammonia and water or urea and water rapidly changes to a mixture of liquid ammonia and saturated water plus vaporized ammonia and steam or liquid urea and saturated water plus vaporized urea and steam due to the thermodynamic throttling process that occurs as the reactant/water solution exits a small bore hole in an injection nozzle. The throttling process results in an improved mixing of the ammonia or urea with the flue gas stream in three ways. First, the increase in turbulence in the ammonia or urea at the exit to the nozzle increases the rapidity with which the mixing takes place. Second, the increase in the volume of the ammonia or urea finely atomizes any remaining liquid portion of the ammonia or urea exiting the nozzle. The resulting increase in surface area of the liquid portion of the reactant allows for its more rapid vaporization. Thirdly, the change in phase rapidly converts a portion of the liquid ammonia or liquid urea to a vapor necessary for the Selective Catalytic Reduction process. This vaporization reduces that quantity of urea that must be vaporized by heat absorbed from the flue gas. The improvement in mixing results in a more uniform distribution of the now gaseous urea reactant across the flue gas stream which in turn helps ensure that the catalytic reduction process occurs more evenly over the surface of the catalytic material. Furthermore, the rapidity with which the mixing occurs, due to the throttling process, allows for injection of the reactant to take place closer to the SCR chamber, thus reducing the length of expensive ductwork required to support the mixing process.

The present invention further encourages a more efficient catalytic reduction process by recognizing that the catalytic reduction process occurring between the reactant/flue gas mixture and the catalytic material is a mass transfer limited reaction as described in "$NO_x$ Control Technologies For Coal Combustion" by A. Hjalmarsson, International Energy Agency Coal Research, June 1990. The catalytic reduction process requires diffusion of the reactant and $NO_x$ onto the catalytic surface. It is a five step process beginning with the adsorption of ammonia at active sites on the surface of the catalytic material. Next there is diffusion of NO to the adsorbed ammonia followed by the chemical reduction on the surface of the catalytic material, giving up molecular nitrogen and water vapor. Finally there is oxidation of the metal hydroxides and regeneration of the active sites. The mechanics of the above process are equally applicable when urea is used as the reactant. The present invention enhances the above process by providing a source of acoustical energy in the form of acoustical waves directed at the reactant/flue gas mixture along predetermined directions and within a predetermined frequency range. The utilization of the energy in the longitudinal acoustical waves increases turbulence in the reactant/flue gas mixture without a significant loss of pressure. The energy imparted to the reactant/flue gas mixture increases contact between the molecules of the reactant/flue gas mixture and the active sites on the surface of the catalytic material; thereby increasing the total amount of catalytic reduction that occurs and resulting in a more efficient catalytic reduction process.

The present invention is also capable of use so as to compensate for unwanted gradients in the mass flow rate of the flue gas that develop across the flue gas stream due to the geometry of the gas duct upstream of the point of injection of reactant into the flue gas stream. By a judicious manipulation of control valves, located between the reactant source and the nozzles, the reactant can be injected into selected segments of the flue gas stream so as to create gradients in the mass flow rate of the reactant. These gradients will act so as to compensate for the aforesaid unwanted gradients in the mass flow rate of the flue gas, thereby resulting in a more nearly constant reactant/$NO_x$ stoichiometric ratio across the flue gas stream.

It is therefore an object of the present invention to provide a new and improved method of mixing a reactant with a flue gas stream.

It is also an object of the present invention to provide such a new and improved method of mixing a reactant with a flue gas stream such that through the use thereof distribution of the reactant within the flue gas stream is more uniform across the flue gas stream.

It is further an object of the present invention to provide such a new and improved method of mixing a reactant with a flue gas stream such that through the use thereof the rapidity of mixing of the reactant with the flue gas stream is improved.

It is also an object of the present invention to provide such a new and improved method of mixing a reactant with a flue gas stream such that through the use thereof there is no longer a need for the presence of additional flow control devices to induce uniform mixing.

It is still further an object of the present invention to provide such a new and improved method of mixing a reactant with a flue gas stream such that through the use thereof pressure losses due to the means of injecting and mixing of the reactant with the flue gas stream are minimized.

It is further an object of the present invention to provide such a new and improved method of mixing a reactant with a flue gas stream such that through the use thereof the effect of gradients in the mass flow rate of the flue gas stream on the reactant stoichiometric ratio are reduced by creating compensating gradients in the mass flow rate of the reactant across the flue gas stream.

It also an object of the present invention to provide a means for increasing the amount of catalytic reduction occurring between the reactant/flue gas mixture and the catalytic material by acoustic energy.

It is yet a further object of the present invention to provide such a new and improved method of mixing a reactant with a flue gas stream such that through the use thereof there is a more efficient Selective Catalytic Reduction process.

In accordance with the present invention there is provided a system and a method for introducing a reactant into a flue gas stream which has been generated from the combustion process occurring within the furnace of a fuel-fired steam generator. The present invention is characterized such that the mixing of the reactant with the flue gas stream is more uniform across the flue gas stream, is completed more rapidly and substantially before the mixture of reactant and flue gas stream subsequently enter a SCR chamber and wherein there is a minimal increase in the total pressure coefficient of the power plant.

In accordance with the present invention, mixing of the reactant with the flue gas stream is accomplished, in accordance with a first aspect of the present invention, by a method for mixing a reactant with the flue gas for use in a fuel-fired steam generator having a furnace volume for the combustion of fuel and air therein and the generation of flue gases thereby and a flue gas flow path for the flow of flue gas therealong between the furnace volume and a downstream release location. The method includes the steps of: a) effecting rotational motion of the flue gas along a predetermined portion of the flue gas flow path; and b) introducing the flue gas and the reactant into contact with one another during the flow of the rotating flue gas along the predetermined portion of the flue gas flow path.

In accordance with one variation of the first aspect of the present invention, the aforesaid mixing is accomplished by way of the utilization of a system comprising a reactant source, a grid of pipes connected at one end thereto and having the other end immersed within, and perpendicular to the direction of flow of, the flue gas stream. The grid may consist of either interconnected pipes or of a first bank of parallel pipes disposed in a first direction slightly upstream or slightly downstream of a second bank of parallel pipes disposed in a second direction perpendicular to the first direction. The piping grid effectively establishes an array of rectangular cells lying within, or substantially within, a common plane which lies perpendicular to the direction of the flow of the flue gas stream.

The number of cells within each grid is dictated by consideration of the relation between the cross sectional area of the gas duct, the flue gas volumetric flow rate, reactant volumetric flow rate, nozzle hole size, and angle of injection of reactant. The reactant is injected into the flue gas stream from the reactant's source through nozzles positioned at appropriate locations along the perimeters of each cell and at a sufficient velocity and appropriate angle. As such, a rotational or swirling motion is imparted to the mixture of reactant and flue gas around an imaginary swirling circle, with radius R, centered within each cell and lying in the plane of the grid. Such rotational motion, coupled with the number of cells for which the system is designed, creates a more uniform mixture of the reactant within the flue gas stream and induces the reactant mixing to occur more rapidly. Control of the introduction of the reactant into the flue gas stream is accomplished by an appropriate set of control valves in the piping works disposed between the reactant source and the grid.

In accordance with a second aspect of the present invention, mixing of the reactant with the flue gas stream may also be accomplished by employing a nongrid-like arrangement of the pipes. By removing one bank of parallel pipes from the grid-like arrangement of non-interconnected parallel pipes, a swirling motion may still be imparted to the flue gas stream by injecting the reactant into the flue gas stream from the reactant's source through nozzles positioned at appropriate locations along the non-interconnected pipes at a sufficient velocity and appropriate angle.

Mixing of the reactant with the flue gas stream is also accomplished in such a manner that, by judicious manipulation of control valves, gradients are established in the mass flow rate of the reactant across the flue gas stream. These gradients act so as to compensate for gradients that exist in the mass flow rate of the flue gas across the flue gas stream; thereby maintaining a more nearly constant reactant/$NO_x$ stoichiometric ratio.

In accordance with a third aspect of the present invention there is provided a method of mixing a reactant with the flue gas stream by heating a liquid solution of urea or ammonia reactant and water, while under significant pressure, to a temperature well above the atmospheric boiling point of water (100° C.). Thus, upon injection into the flue gas stream, which is at or near atmospheric pressure and generally in a temperature range of about 340° C. to about 400° C., the solution of liquid ammonia and water or liquid urea and water rapidly changes to a mixture of liquid ammonia and saturated water or liquid urea and saturated water, plus vaporized ammonia and steam or vaporized urea and steam. This process results in a more uniform mixing of the reactant with the flue gas stream. It also allows the aforesaid mixing to be accomplished more rapidly, thus allowing injection to occur closer to the SCR chamber.

An increase in the amount of catalytic reduction taking place between the reactant/flue gas mixture and the catalyst is accomplished by directing a source of acoustical waves at the reactant/flue gas mixture. The acoustical waves are operative over a prescribed frequency band such that the energy of the waves acts to increase contact between molecules of the reactant/flue gas mixture and active sites on the surface of catalytic material; thus improving the Selective Catalytic Reduction process.

DESCRIPTION OF THE PREFERRED EMBODIMENT

Figure 1:
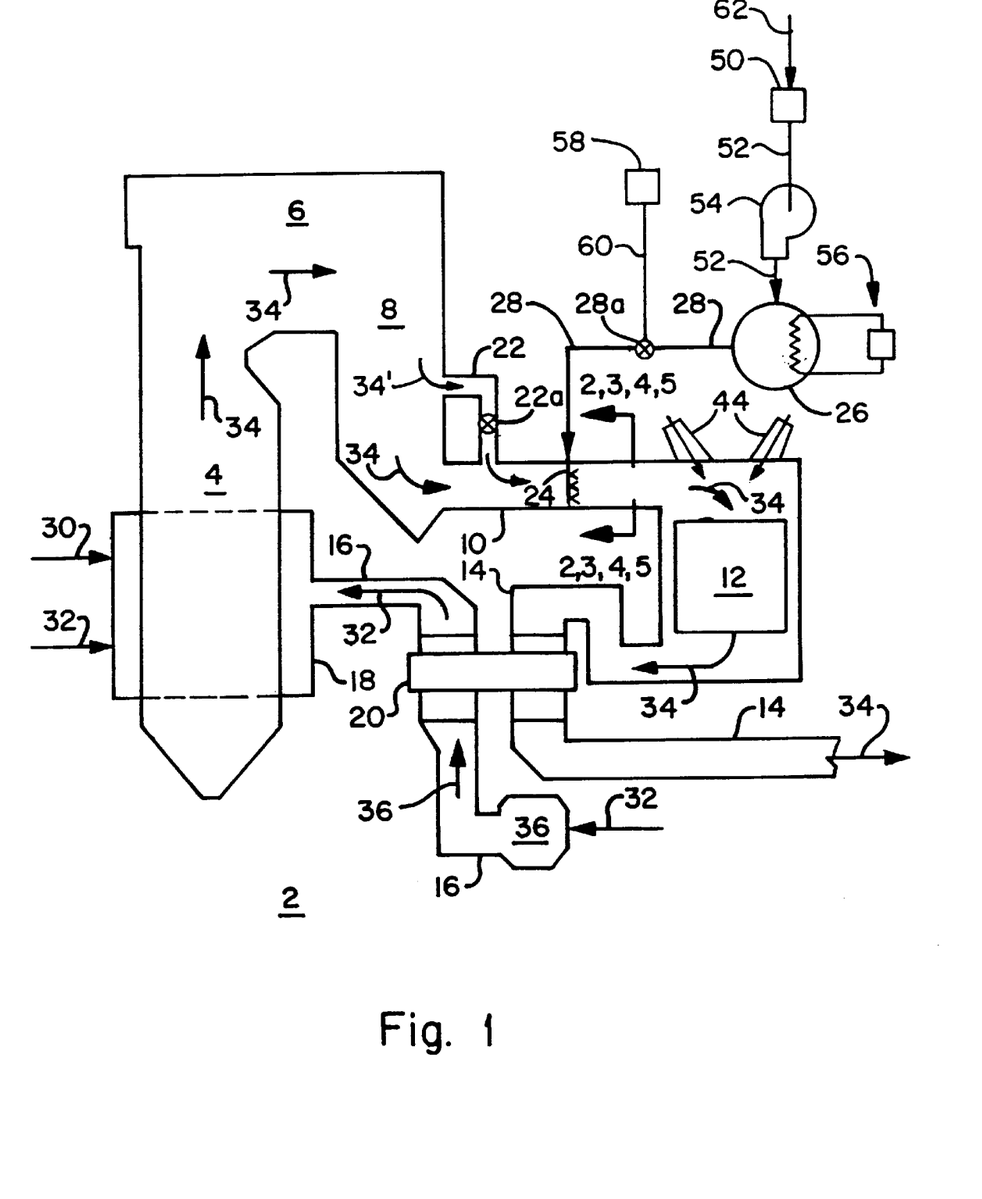
FIG. 1 is schematic representation in the nature of a side elevation of a fuel-fired steam generator as it is generally comprised of a furnace volume, a horizontal pass, a back-pass volume, a gas duct, a Selective Catalytic Reduction chamber, an air preheater, associated ductwork, and a system for mixing a reactant with a flue gas flowing through the gas duct constructed in accordance with the present invention.

Referring now to FIG. 1 there is depicted a fuel-fired steam generator 2 generally comprising a furnace volume 4, a horizontal pass 6, a backpass volume 8, a gas duct 10, a Selective Catalytic Reaction chamber 12, associated other ductwork 14, 16, a firing system 18 and a preheater 20. Inasmuch as the nature of the construction and the mode of operation of fuel-fired steam generators is well known to those skilled in the art, it is not deemed necessary to set forth a detailed description of the fuel-fired steam generator 2. Rather, for purposes of obtaining an understanding of a fuel-fired steam generator, that is capable of acting in cooperative association with the present invention, it is deemed sufficient that there be presented merely a description of the nature of the components of the fuel-fired steam generator 2. For a more detailed description of the nature of the construction and mode of operation of the components of a fuel-fired steam generator, for instance a pulverized coal burning steam generator, reference may be had to the prior art, e.g., U.S. Pat. No. 4,719,587, which issued Jan. 12, 1988 and is assigned to the same assignee as the present patent application.

It is within the furnace volume 4 that, in a manner well known to those skilled in the art, combustion of fuel 30 and air 32 is initiated. The hot gases 34 that are produced from this combustion, and generally known as flue gases 34, rise upwardly within the furnace volume 4 and give up energy to the working fluid of a thermodynamic steam cycle. The working fluid passes through furnace waterwall tubes (not shown for clarity of illustration) which in a conventional manner line all four walls of the furnace volume 4. The flue gases 34 then exit the furnace volume 4 through the horizontal pass 6 and are directed to and through the backpass volume 8 of the steam generator 2. Both the horizontal pass 6 and the backpass volume 8 commonly contain additional heat exchange surfaces (not shown for clarity) for superheating and reheating steam in a manner well known to those skilled in the art. Thereafter, the steam commonly is made to flow to a turbine (not shown), which forms one component of a turbine/generator set (not shown). The steam provides the motive power to drive the turbine which thence drives the generator, which in known fashion produces electricity.

After the flue gases 34 pass through the backpass volume 8, wherein they give up additional energy to the working fluid of the thermodynamic steam cycle, they are conducted along a gas duct 10 to a SCR chamber 12 and thence, via additional ductwork 14, to an air preheater 20, which preheats combustion air 32, and finally to further flue gas cleaning apparatus (not shown) and the atmosphere via a stack (not shown). The aforesaid combustion air 32 is delivered, via a fan 36 and additional ductwork 16, to the air preheater 20 and thence to the firing system 18.

It is also to be understood from FIG. 1 that there exists a bypass duct 22, including a bypass damper 22a, operative so as to divert a comparatively small volume of flue gas 34' from the upper segment of the backpass volume 8 to the gas duct 10 for purposes of controlling the temperature of the flue gas stream 34 as the flue gas stream 34 enters the SCR chamber 12.

Figure 2:
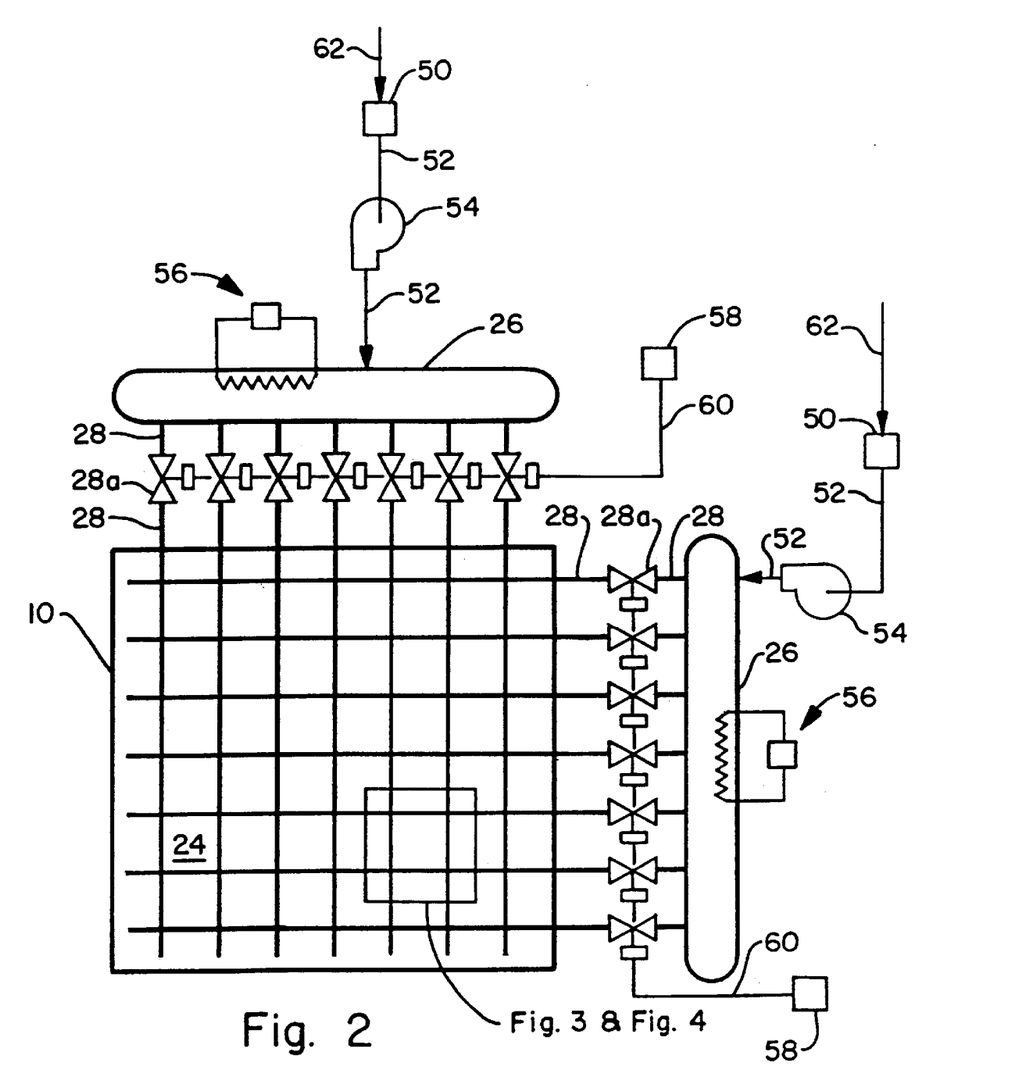
FIG. 2 is a schematic diagram of a Tangential Reactant Injection Grid System as it is generally comprised of a reactant source, means for pressurizing the reactant, means for heating the reactant, a collecting header, a plurality of pipes defining a plurality of adjacent geometric cells disposed within the gas duct, a plurality of control valves and means for controlling the control valves in accordance with one aspect of the present invention.

Referring now to FIG. 2 there is depicted, by way of exemplification and not limitation, a schematic diagram of a Tangential Reactant Injection Grid System as it is generally comprised of a reactant source 50, means 54 for pressurizing the reactant, means 56 for heating the reactant, a collecting header 26 in fluid communication with the pressurizing means 54 and the reactant source 50 via conventional piping 52, a plurality of pipes 28 in fluid communication with the collecting header 26, a plurality of control valves 28a operatively connected to the plurality of pipes 28, means 58 for controlling the control valves 28a in signal communication therewith via conventional signal path 60 and means 62 for adding water to the reactant. It should be understood from FIG. 2 that, although shown therein are two of the reactant source 50, pressurizing means 54, heating means 56 control means 58 and conventional piping 58, the present invention is operative with one thereof. It should also be understood from FIG. 2 that the control means 58 may be any convention software or other programmable logic for effecting the intended control of the control valves and known and understood by those skilled in the art.

Continuing in FIG. 2, the plurality of pipes 28 are arranged so as to define a plurality of adjacent geometric shapes, referred to hereinafter as cells 24, disposed within the gas duct 10 and lying substantially within a plane perpendicular to the direction of the flow of the flue gas stream 34. As best understood with respect to FIG. 2, the means 54 for pressurizing the reactant and means 56 for heating the reactant may both be conventional in nature and known and understood by those skilled in the art.

Figure 3:
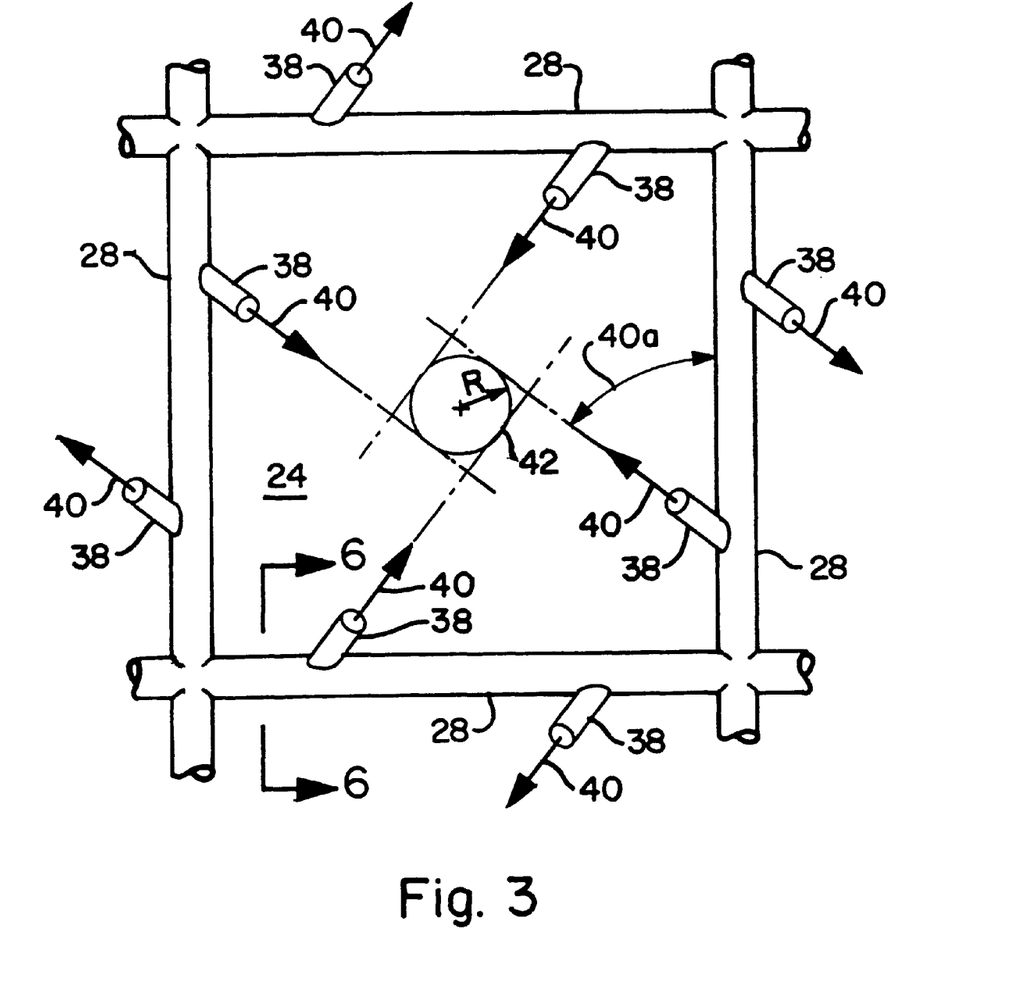
FIG. 3 is a schematic diagram showing in greater detail a section of the Tangential Reactant Injection Grid System of FIG. 2 as it is comprised of a plurality of interconnected pipes defining a typical cell of the plurality of adjacent cells including a plurality of injection nozzles.
Figure 4:
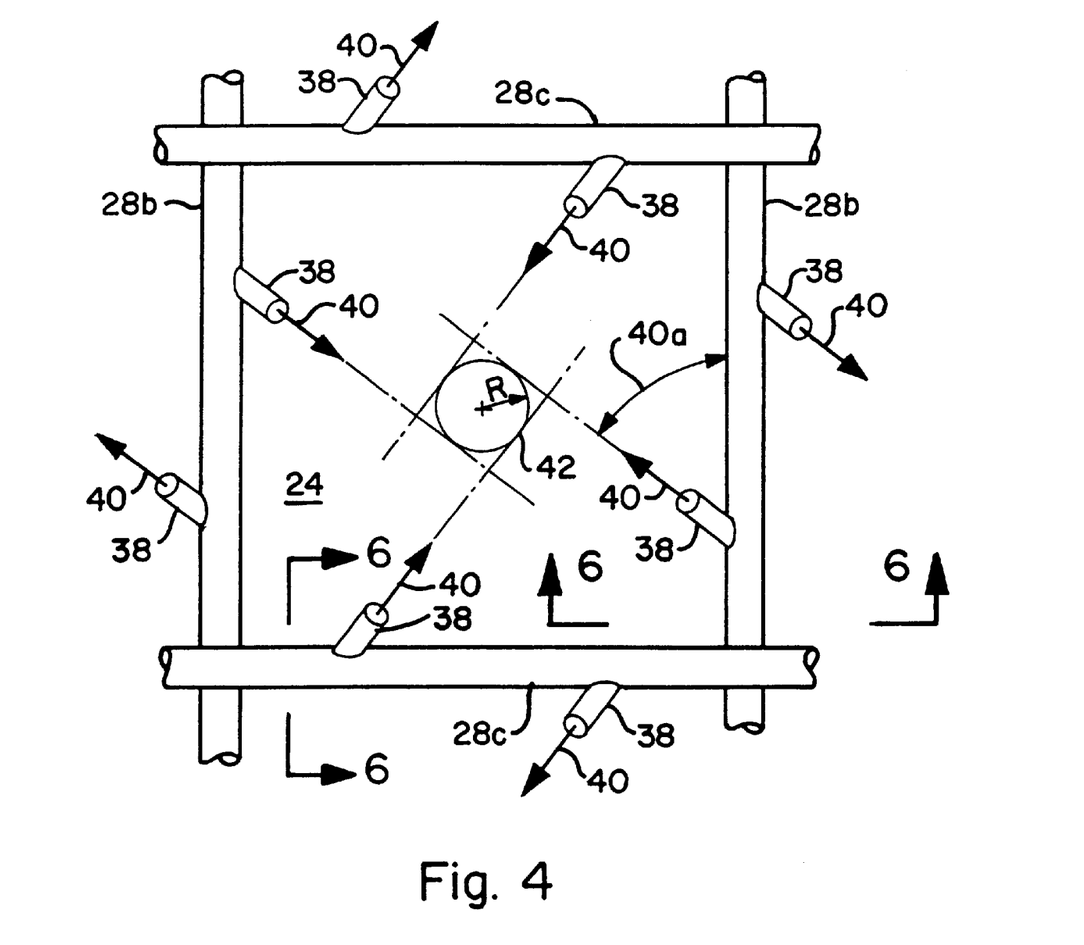
FIG. 4 is a schematic diagram showing in greater detail a section of the Tangential Reactant Injection Grid System of FIG. 2 as it is comprised of a plurality of non-interconnected pipes defining a typical cell of the plurality of adjacent cells including a plurality of injection nozzles.
Figure 5:
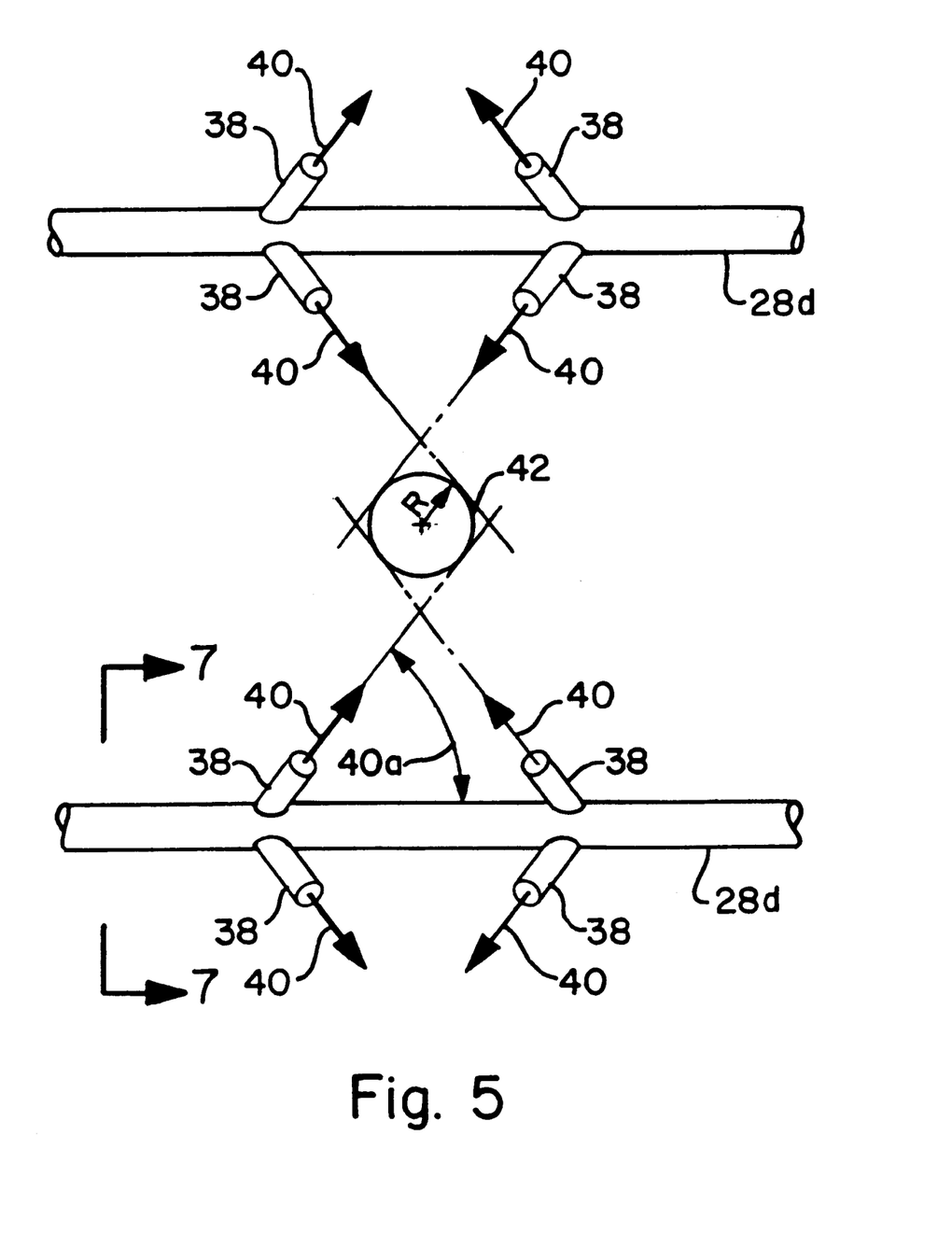
FIG. 5 is a schematic diagram showing in greater detail a section of the Tangential Reactant Injection Grid System of FIG. 2 as it is comprised of a single bank of pipes including a plurality of injection nozzles.

In the interest of greater clarity in describing the Tangential Reactant Injection Grid System reference is now made to FIGS. 3, 4, and 5.

Figure 6:
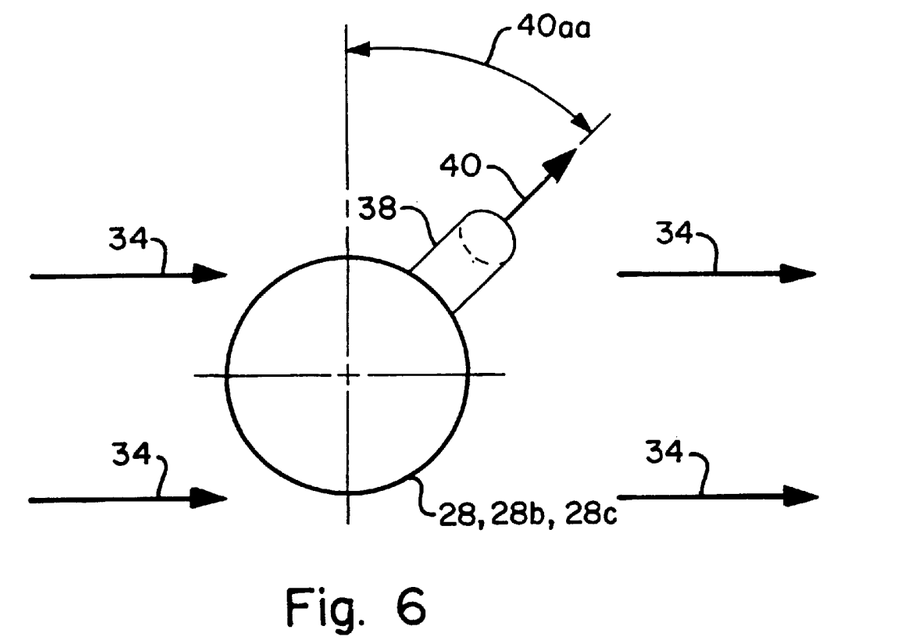
FIG. 6 is a sectional view of the orientation of an injection nozzle on a pipe with respect to the direction of flow of the flue gas typical of that seen in FIGS. 3 and 4.

In accordance with a first aspect of the present invention, FIG. 3 is, by way of exemplification and not limitation, a schematic representation of a single cell 24 which is intended to be typical and representative of the plurality of adjacent geometric cells 24 seen in FIG. 2. It is seen in FIG. 3 that the cell 24 is defined by a plurality of interconnected pipes 28 and that at appropriate locations along the interconnected pipes 28, congruent with the perimeter of the cell 24, there are found a plurality of injection nozzles 38 each having a relatively small bore hole (not shown) drilled therethrough whereby the environment of the gas duct 10 is in fluid communication with the collection header 26. The plurality of injection nozzles 38 are oriented on the respective interconnected pipes 28 at an adjustable angle 40a, measured relative thereto, so as to allow injection of the reactant into the flue gas stream 34 along predetermined directions 40. The predetermined directions 40 cooperate so as to be substantially symmetrically tangential to an imaginary swirling circle 42 of radius R centered at or near the geometric center of the cell 24. The geometric center of the cell 24 lies on an axis parallel to a streamline of the flue gas stream 34. The swirling circle 42 also lies substantially within the plane of the cell 24 and is substantially perpendicular to the direction of the flow of the flue gas stream 34. In the interest of greater clarity in understanding the orientation of the injection nozzles 38 with respect to the pipes 28 and with respect to the direction of flow of the flue gas stream 36 reference is now made to FIG. 6. FIG. 6 depicts a sectional view of a pipe 28 and an injection nozzle 38 typical of that seen in FIG. 3. As best understood from FIG. 6, the injection nozzle 38 may also be oriented on the pipe 28 at an angle 40aa so as to allow injection of the reactant into the flue gas stream 34 along a direction 40 that is slightly down stream as measured with respect to the flow of the flue gas stream 34.

Thus, it should be obvious from the foregoing description of the first embodiment of the present invention that injection of the reactant at a predetermined velocity along the aforesaid predetermined directions 40 induces a rotational or swirling motion in the flue gas stream 34 about the swirling circle 42. The swirling motion is characterized by a swirling number and acts to improve mixing of the reactant with the flue gas stream 34 such that there is an improvement in the uniformity in the resultant mixture as well as an increase in the rapidity with which the mixing takes place.

In accordance with a second aspect of the present invention, reference is made to FIG. 4. Therein depicted is, by way of exemplification and not limitation, a schematic representation of a single cell 24 which is also intended to be typical and representative of the plurality of adjacent geometric cells 24 seen in FIG. 2. In accordance with the second aspect of the present invention, as seen in FIG. 4, the cell 24 is defined by a plurality of non-interconnected pipes 28b, 28c. The plurality of non-interconnected pipes 28b, 28c is comprised of a first plurality of parallel pipes 28b slightly upstream or slightly downstream of a second plurality of parallel pipes 28c. It should be understood from FIG. 4 that, for purposes of the present invention, it is immaterial which plurality of pipes 28b, 28c is upstream or downstream of the other. At appropriate locations along the non-interconnected pipes 28b, 28c, congruent with the perimeter of the cell 24, there is found a plurality of injection nozzles 38. The plurality of injection nozzles 38 are oriented on the respective non-interconnected pipes 28b, 28c at an adjustable angle 40a, measured relative thereto, so as to allow injection of the reactant into the flue gas stream 34 along predetermined directions 40. The predetermined directions 40 cooperate so as to be tangential to an imaginary swirling circle 42 of radius R centered at or near the geometric center of the cell 24. The geometric center of the cell 24 lies on an axis parallel to a streamline of the flue gas stream 34. The swirling circle 42 also lies substantially within the plane of the cell 24 and is substantially perpendicular to the direction of the flow of the flue gas stream 34. In the interest of greater clarity in understanding the orientation of the injection nozzles 38 with respect to the pipes 28b, 28c and with respect to the direction of flow of the flue gas 36 reference is again made to FIG. 6. FIG. 6 depicts a sectional view of a pipe 28b, 28c and an injection nozzle 38 typical of that seen in FIG. 4. As best understood from FIG. 6 the injection nozzle 38 may also be oriented on the pipe 28b, 28c at an angle 40aa so as to allow injection of the reactant into the flue gas stream 34 along a direction 40 that is slightly down stream as measured with respect to the flow of the flue gas stream 34.

Thus, it should be obvious from the foregoing description of the second embodiment of the present invention that injection of the reactant at a predetermined velocity along the aforesaid directions 40 induces a rotational or swirling motion in the flue gas stream 34 about the swirling circle 42. The swirling motion is characterized by a swirling number and acts to improve mixing of the reactant with the flue gas stream 34 such that there is an improvement in the uniformity in the resultant mixture as well as an increase in the rapidity with which the mixing takes place.

It should further be understood from FIG. 4 that, through the judicious manipulation of the control valves 28a of FIG. 2 amongst the individual pipes 28b, 28c, it is possible, by way of control means 58, to select segments of the cross sectional area of the duct 10 in which to concentrate the introduction of the reactant. This then establishes gradients in the mass flow rate of the reactant across the flue gas stream 34 which act so as to compensate for existing gradients in the mass flow rate of flue gas stream 34 and thereby maintain a more nearly constant reactant/$NO^x$ stoichiometric ratio.

Figure 7:
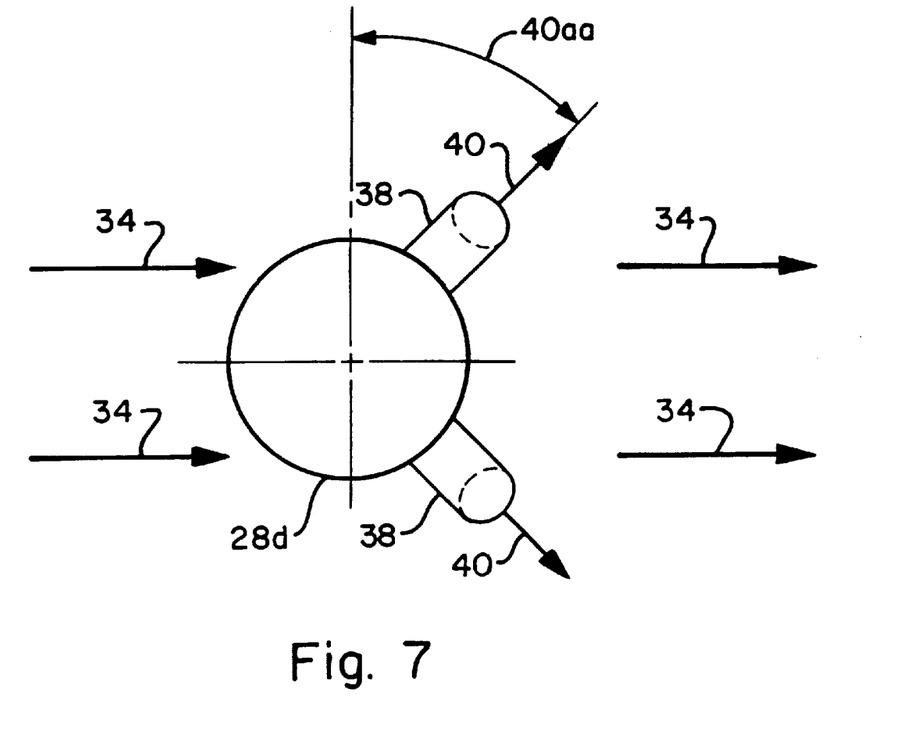
FIG. 7 is a sectional view of the orientation of a pair of injection nozzles on a pipe with respect to the direction of flow of the flue gas typical of that seen in FIG. 5.

Referring now to FIG. 5 there is depicted, by way of exemplification and not limitation, a third embodiment of the present invention. As best understood with respect to FIG. 5, there exists in accordance with the third aspect of the present invention, a plurality of parallel pipes 28d lying in a plane which is substantially perpendicular to the direction of flow of the flue gas stream 34. At appropriate locations along the parallel pipes 28d there is found a plurality of injection nozzles lo 38. The plurality of injection nozzles 38 are oriented on the respective parallel pipes 28d at an adjustable angle 40a measured relative thereto so as to allow injection of the reactant into the flue gas stream 34 along predetermined directions 40. The predetermined directions 40 cooperate so as to be tangential to an imaginary swirling circle 42 of radius R centered midway between the parallel pipes 28d at appropriate intervals along the direction of the parallel pipes 28d. The swirling circle 42 also lies substantially within the plane of the parallel pipes 28d and is perpendicular to the direction of the flow of the flue gas stream 34. In the interest of greater clarity in understanding the orientation of the injection nozzles 38 with respect to the pipes 28d and with respect to the direction of flow of the flue gas stream 36 reference is now made to FIG. 7. FIG. 7 depicts a sectional view of a pipe 28d and a pair of nozzles 38 typical of that seen in FIG. 5. As best understood from FIG. 7 the injection nozzles 38 may also be oriented on the pipe 28d at an angle 40aa so as to allow injection of the reactant into the flue gas stream 34 along directions 40 that are slightly down stream of the flow of the flue gas stream 34. It should be understood from FIG. 5 that it is immaterial in which direction the pipes 28d are oriented with respect to the gas duct 10.

Thus, it should be obvious from the foregoing description of the third embodiment of the present invention that injection of the reactant at a predetermined velocity along the aforesaid directions 40 induces a swirling motion to the flue gas stream 34 about the swirling circle 42. The swirling motion acts to improve mixing of the reactant with the flue gas stream 34 in that there is an improved uniformity in the resultant mixture as well as an increase in the rapidity with which the mixing takes place.

It should further be understood from FIG. 5 that, through the judicious manipulation of the control valves 28a of FIG. 2 amongst the individual pipes 28d of the bank of parallel pipes 28d, it is possible, by way of control means 58, to select segments of the cross sectional area of the duct 10 in which to concentrate the introduction of the reactant. This then establishes gradients in the mass flow rate of the reactant across the flue gas stream 34 which act so as to compensate for existing gradients in the mass flow rate of the flue gas stream 34 and maintain a more nearly constant reactant/$NO_x$ stoichiometric ratio.

Simultaneous with any of the aforesaid embodiments of the present invention, mixing of the reactant with the flue gas stream 34 in the gas duct 10 is further accomplished by utilizing a solution of liquid urea and water or liquid ammonia and water of known ratio; typically within the range of about 30% to about 40% reactant by weight. The liquid solution is also in a first thermodynamic state defined by a first pressure, P1, of about one atmosphere and a first temperature, T1, of about room temperature. In accordance with the best mode of the present invention the liquid solution of urea and water or ammonia and water is first further diluted to a ratio of about 2% to about 4% reactant by weight as represented by the reference numeral 62 in FIG. 1 and FIG. 2. The reactant solution is then pressurized, by any conventional means 54, from the first pressure, P1, to a second pressure, P2, which is significantly higher than the pressure, Pfg, of the flue gas existing in the gas duct 10.

The liquid solution of urea and water or ammonia and water is then collected in a collection header 26 and heated, also by any conventional means 56, from the first temperature, T1, to a second temperature, T2, which is well above the atmospheric boiling point of water (100° C.). From this second thermodynamic state, defined by the second pressure, P2, and the second temperature, T2, the liquid solution of urea and water or ammonia and water is allowed to expand through the small bore holes of the nozzles 38, i.e., to be thermodynamically throttled, to a third state. The third state is defined by the conditions of pressure, Pd, and temperature, Td, of the flue gas 34 flowing through the gas duct 10. As a result of the above thermodynamic throttling, the solution of liquid ammonia and water or liquid urea and water rapidly changes to a multiphase fluid, i.e., a mixture of liquid ammonia and saturated water or liquid urea and saturated water, plus vaporized ammonia and steam or vaporized urea and steam. It is to be understood that the aforesaid thermodynamic throttling of the solution of liquid urea or ammonia and water occurs between two points along the flow path of the solution. The first point is immediately upstream of the exit to the nozzle 38 via the small bore hole. The second point is immediately after the solution exits the pipe 28, 28b, 28c, 28d through the nozzle 38 via the small bore hole. The effect of the thermodynamic throttling is an irreversible process whereby there is an improved mixing of the liquid reactant with the flue gas 34 stream. As a result of the improved mixing there is a greater uniformity in the resultant reactant/flue gas mixture across the flue gas stream 34 as well as an increase in the rapidity with which the mixing takes place.

It should be understood that in describing the above thermodynamic throttling process it is the case that the liquid solution of reactant and water may first be pressurized then heated or first heated and then pressurized or heated and pressurized simultaneously.

Figure 8:
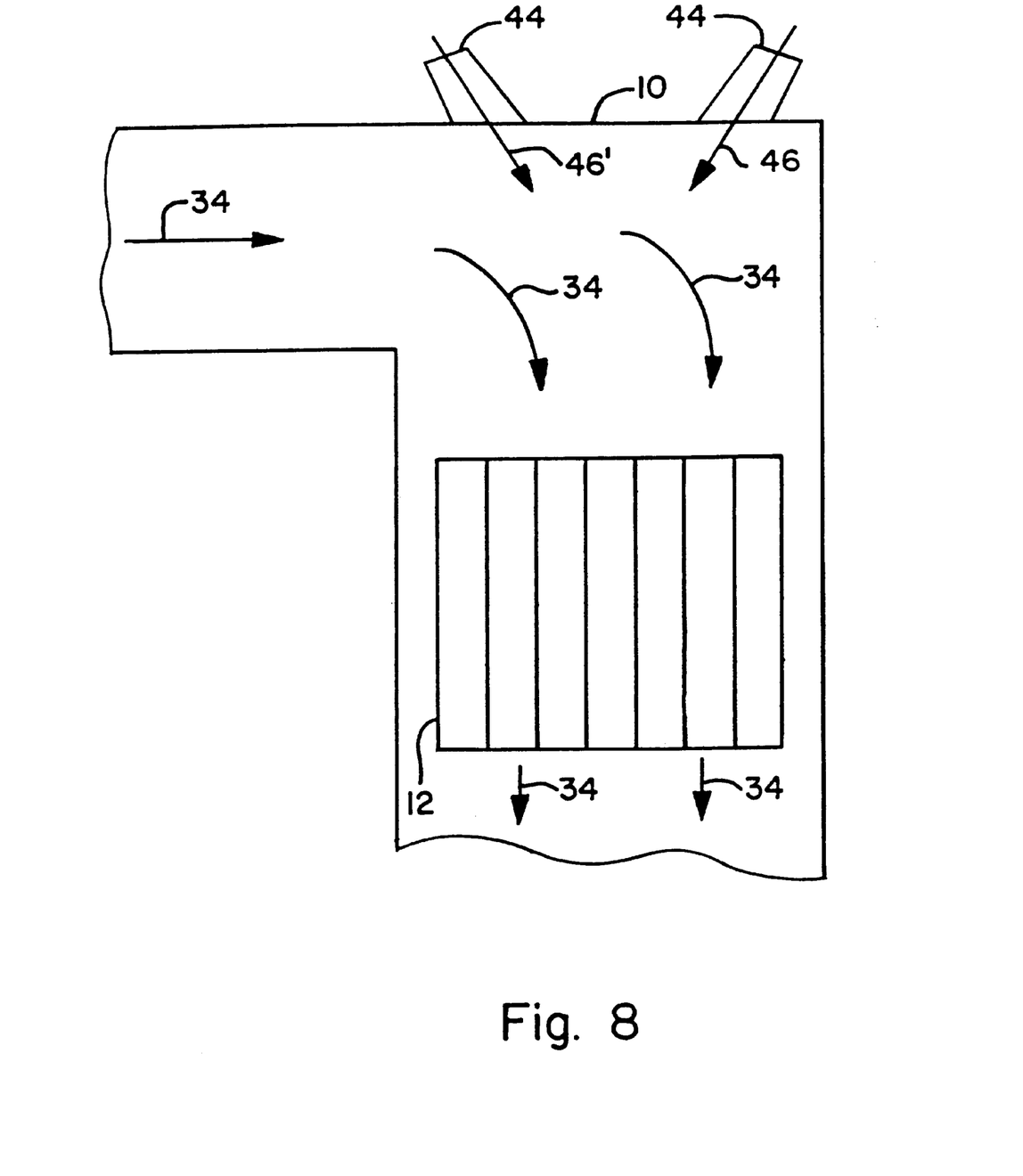
FIG. 8 is a schematic diagram showing in greater detail a segment of the gas duct and the Selective Catalytic Reduction chamber of FIG. 1 including an acoustical energy source.

Reference is again made to FIG. 1. Therein depicted by way of exemplification and not limitation is a plurality of conventional acoustical energy sources 44. It is seen in FIG. 1 that the acoustical energy sources 44 are located at appropriate locations along the gas duct 10 downstream of the injection grid 24 and upstream of the SCR chamber 12. In the interest of greater clarity in understanding the operation of the acoustical energy sources 44 reference is now made to FIG. 8. It should be understood from FIG. 8 that the acoustical energy sources 44 are mounted by any conventional means upon the gas duct 10 so as to respectively direct acoustical energy along predetermined directions 46, 46' toward the reactant/flue gas mixture 34 as the mixture enters the SCR chamber 12. The acoustical energy, so directed along the predetermined directions 46, 46', is operative for its intended purpose over an appropriate frequency band. Furthermore, it is such that the acoustical energy will act so as to agitate the molecules of the reactant/flue gas mixture 34, thereby improving mixing thereof. In addition, the acoustical energy will act so as to randomly impart a change in momentum to the molecules of the reactant/flue gas mixture 34. The random change in momentum thereby causes the molecules of the reactant/flue gas mixture 34 to acquire a component of motion perpendicular to the direction that the reactant/flue gas mixture 34 normally would possess as the reactant/flue gas mixture 34 passes through the SCR chamber 12. This change in momentum thereby causes it to be more likely for the molecules of the reactant/flue gas mixture 34 to make contact with the surface of the catalytic material thus increasing the amount of catalytic reduction taking place within the SCR chamber 12.

It should now be obvious from the foregoing descriptions of the several embodiments of the present invention that there is provided thereby a new and improved a method for mixing a reactant with a flue gas stream. Furthermore, in accordance with the present invention, there has been provided a new and improved method of mixing a reactant with a flue gas stream such that through the use thereof, distribution of the reactant within the flue gas stream is more uniform across the flue gas stream. In addition, in accordance with the present invention, there has been provided a new and improved method of mixing a reactant with a flue gas stream such that through the use thereof, there is an increase in the rapidity with which the reactant mixes with the flue gas stream. Also, there has been provided a new and improved method of mixing a reactant with a flue gas stream such that through the use thereof, there is no longer a need for the presence of additional flow control devices to induce uniform mixing of the reactant with the flue gas stream. Still further, in accordance with the teachings of the present invention, there has been provided a new and improved method of mixing a reactant with a flue gas stream such that through the use thereof, pressure losses due to the means of injecting and mixing of the reactant with the flue gas stream are minimized. Moreover, in accordance with the teachings of the present invention, there has been provided a new and improved method of mixing a reactant with a flue gas stream such that through the use thereof, the effect of gradients in the mass flow rate of the flue gas stream on the reactant stoichiometric ratio are reduced by creating compensating gradients in the mass flow rate of the reactant across the flue gas stream.

Still further, in accordance with the teachings of the present invention, there has been provided a new and improved method of mixing a reactant with a flue gas stream such that through the use thereof, there is an improvement in the amount of catalytic reduction occurring in a Selective Catalytic Reduction process.

While several embodiments of our invention have been shown, it will be appreciated that modifications thereto may be readily made by those skilled in the art. We therefore intend by the appended claims to cover any modifications which fall within the true spirit and scope of our invention.

We claim:

1. In a fuel-fired steam generator having a furnace volume for the combustion of fuel and air therein and the generation of flue gases thereby and a flue gas flow path for the flow of flue gas therealong between the furnace volume and a downstream release location, a method for mixing a reactant with the flue gas comprising the steps of:
   a. effecting rotational motion of the flue gas along a predetermined portion of the flue gas flow path; and
   b. introducing the flue gas and the reactant into contact with one another during the flow of the rotating flue gas along the predetermined portion of the flue gas flow path.

2. The method of claim 1 wherein the step of introducing the reactant into the flue gas stream includes the step of injecting the reactant into the flue gas stream.

3. The method of claim 2 wherein the step of injecting the reactant into the flue gas stream includes the step of injecting the reactant into the flue gas stream through at least one nozzle.

4. The method of claim 3 wherein the step of injecting the reactant into the flue gas stream through at least one nozzle includes the step of injecting the reactant into the flue gas stream through a plurality of nozzles.

5. The method of claim 4 wherein the step of injecting the reactant into the flue gas through a plurality of nozzles includes the step of injecting the reactant into the flue gas stream through a plurality of nozzles disposed about an axis parallel to a streamline of the flue gas stream.

6. The method of claim 5 wherein the step of injecting the reactant into the flue gas stream through a plurality of nozzles includes the step of injecting the reactant into the flue gas stream so as to effect rotational motion in the flue gas stream about at least one axis parallel to at least one streamline of the flue gas stream.

7. The method of claim 6 wherein the step of injecting the reactant into the flue gas stream so as to effect rotational motion in the flue gas stream includes the step of changing the reactant from a single phase fluid defined by a first pressure and a first temperature to a multiphase fluid defined by a second pressure less than the first pressure and a second temperature.

8. The method of claim 1 wherein the method of mixing a reactant with the flue gases further includes the step of directing acoustical energy at the reactant/flue gas mixture over a prescribed frequency band.

9. In a fuel-fired steam generator having a furnace volume for the combustion of fuel and air therein and the generation of flue gases thereby, a backpass volume, a horizontal pass for conducting the flue gases from the furnace volume to the backpass volume, a Selective Catalytic Reduction chamber, and a gas duct for further conducting the flue gases from the backpass volume to the Selective Catalytic Reduction chamber at a flue gas pressure and a flue gas temperature, a system for mixing a reactant with the flue gases flowing in the gas duct, the system comprising:

a. means for effecting rotational motion of the flue gas along a predetermined portion of the flue gas flow path; and b. means for introducing the flue gas and the reactant into contact with one another during the flow of the rotating flue gas along the predetermined portion of the flue gas flow path.

10. The system as set forth in claim 9 wherein the means for introducing the reactant into the flue gas stream includes a reactant source wherein the reactant is held at a first pressure and a first temperature;

means operatively connected to the reactant source for changing the pressure of the reactant from the first pressure to a second pressure and for effecting the flow of the reactant;

means for collecting the reactant operatively connected to the means for changing the pressure of the reactant;

means operatively connected to the collecting means or the reactant source for changing the temperature of the reactant from the first temperature to a second temperature;

a plurality of pipes each having a first end thereof connected to the collecting means with opposing ends thereto disposed within the flue gas duct;

a plurality of injection nozzles operatively connected to the plurality of pipes within the flue gas duct each of the injection nozzles having a small bore hole drilled therethrough so as to establish a flow path between the collecting means and the environment of the flue gas;

a plurality of control valves operatively connected to the plurality of pipes; and means operatively connected to the plurality of control valves for controlling collectively or individually the operation of the control valves thereby controlling the mass flow rate of the reactant into the flue gas stream.

11. The system as set forth in claim 10 wherein the means for effecting rotational motion in the flue gas stream about at least one axis parallel with at least one streamline of the flue gas stream and the means for introducing the reactant into the flue gas stream are the same means.

12. In a fuel-fired steam generator the system for mixing a reactant with the flue gases as set forth in claim 11 wherein the plurality of pipes are alternatingly interconnected therebetween within the flue gas duct defining thereby a first array of adjacent, planar, geometric cells, the first array of geometric cells disposed perpendicular to the direction of flow of the flue gas.

13. In a fuel-fired steam generator the system for mixing a reactant with the flue gases as set forth in claim 12 wherein at least one injection nozzle of the plurality of injection nozzles is disposed along each side of the first array of geometric cells.

14. In a fuel-fired steam generator the system for mixing a reactant with the flue gases as set forth in claim 13 wherein the at least one injection nozzle of the plurality of injection nozzles is oriented so as to direct the reactant into the flue gas along predetermined directions down stream of the flow of the flue gas stream whereby a rotational motion is thereby induced in the flue gas stream central to each cell of the first array of geometric cells.

15. In a fuel-fired steam generator the system for mixing a reactant with the flue gases as set forth in claim 14 wherein the first array of adjacent, planar, geometric cells comprises a selected one of a parallelogramatic type cell.

16. In a fuel-fired steam generator the system for mixing a reactant with the flue gases as set forth in claim 10 further including an acoustical energy source disposed downstream of the plurality of pipes and upstream of a flue gas treatment means, wherein the acoustical energy source is operative over a prescribed frequency band for agitating the molecules of the reactant/flue gas mixture.

* * * * *